United States Patent [19]
Proctor et al.

[11] Patent Number: 6,125,110
[45] Date of Patent: Sep. 26, 2000

[54] METHOD AND SYSTEM FOR DETERMINING A PACKET TRANSMISSION ORDER

[75] Inventors: Lee Michael Proctor, Cary; Gino Anthony Scribano, Elk Grove Village, both of Ill.

[73] Assignee: Motorola Inc., Schaumburg, Ill.

[21] Appl. No.: 09/127,266

[22] Filed: Jul. 31, 1998

[51] Int. Cl.[7] .................................................. H04Q 7/22
[52] U.S. Cl. ................................. 370/331; 455/442
[58] Field of Search .................................... 370/331, 332, 370/335, 342, 350, 394, 395; 455/436, 437, 440, 442

[56] References Cited

U.S. PATENT DOCUMENTS

| | | | |
|---|---|---|---|
| 5,428,822 | 6/1995 | Helenius et al. | 455/433 |
| 5,722,074 | 2/1998 | Muszynski | 455/442 |
| 5,757,783 | 5/1998 | Eng et al. | 370/394 |
| 5,867,500 | 2/1999 | Dolman et al. | 370/395 |
| 5,883,888 | 3/1999 | St-Pierre | 370/350 |
| 5,896,373 | 4/1999 | Mitts et al. | 370/331 |

*Primary Examiner*—Min Jung
*Attorney, Agent, or Firm*—James A. Lamb

[57] ABSTRACT

A method and apparatus for determining the order of transmission of packets of information in a communication system includes a priority assignment processor (330) which receives transmission delay information from a delay analyzer (315) and soft handoff state information from a control processor (320). This information is used to determine a priority level for packets of information. The priority level is used by a network arbiter (350) to determine when the associated packet should be transferred relative to other packets of information.

26 Claims, 3 Drawing Sheets

METHOD AND SYSTEM FOR DETERMINING A PACKET TRANSMISSION ORDER

FIELD OF THE INVENTION

The present invention relates generally to communication systems, and more particularly to a method for determining the order of transmission of packets of information in communication systems.

BACKGROUND OF THE INVENTION

Digital wireless communication systems, such as Code Division Multiple Access (CDMA) cellular systems, are increasingly utilizing packet based transmission protocols to transport information between infrastructure entities. These protocols include frame relay and Asynchronous Transport Mechanism (ATM). The information to be transported includes encoded voice packets, data and control information.

In a digital cellular communication system, a mobile unit communicates over the air interface with a Base Station (BS), which in turn is connected to a Base Station Controller (BSC). Several physical communication mediums can be used between the BS and the BSC, including T1 span lines, microwave links and satellite links. These transport mediums can support several transport mechanisms. The transport mechanisms are typically grouped into two categories, circuit based and packet based. Circuit based protocols typically partition the medium into fixed bandwidth channels in a Time Division Multiplex (TDM) configuration. Each channel is dedicated to one phone call and tends to be very synchronous in operation.

Packet based protocols typically share the medium on a as-needed basis. Greater utilisation efficiency can be achieved by sharing the bandwidth, resulting in the support of more channels. In the case of speech information, conventional code division multiple access (CDMA) cellular systems take advantage of the statistical nature of speech to increase the number of channels handled by a given data "pipe". This is particularly the case with CDMA systems where speech coding algorithms in voice coders (vocoders) generate variable speech packet sizes that are directly related to the amount of speech activity at a given time. With the increased usage of the internet, data services is also increasingly showing a highly variable data rate.

Although packet based mechanisms will typically support a greater number of channels, they suffer from a large variance in transmission delay. This is due to the asynchronous nature of the packet transmission. As packets arrive for transmission on the data pipe, they have to be queued until space can be found to send them. The amount of time that they have to be queued depends heavily on the number of, and size of, other packets that are currently pending. In a cellular system, components at each end of the BS to BSC packet pipe rely on a synchronous data flow. These include the air interface between the BS and the mobile units as well as the interface to and from the vocoders. To support these synchronous interfaces an asynchronous to synchronous conversion is required. Typically this is handled by allowing for the worst case packet variance and buffering data appropriately.

One of the primary benefits of current CDMA systems is the ability to perform soft handoffs. With soft handoff each mobile unit can be in simultaneous communication with multiple BSs. For example if a mobile unit is in a 2-way soft handoff call, framed information will be sent to two BSs, the BSs will process the information, packetize it (in the case of a packet based network) and send it to the BSC. A selector function will analyse the packets received from the two BSs and select the best one for forwarding to, in the case of encoded speech, the vocoder. In the other direction, a speech encoded packet from the vocoder will be duplicated and sent to the two BSs for transmission to the mobile. However, the transmission paths to the BSs from the BSC can exhibit very different delay characteristics. As used herein, a forward link packet is one generated at a base site controller and transmitted via one or more base sites for reception by a mobile unit. A reverse link packet is one generated and transmitted by a mobile unit for reception at a base site controller via one or more base sites.

Digital cellular systems, including CDMA systems, are subject to relatively long delays. Typically delays from the mobile unit, through the BS, the BSC, the Mobile Switching Center (MSC), the Public Switched Telephone Network (PSTN) and back to the mobile unit can exceed 200 milliseconds (ms). Increased use of packet based networks, the mixing of circuit and packet based networks, and the networking of equipment from different manufacturers will cause delays to increase further. Increased speech delays can negatively impact a user's perception of voice quality when in a conversation. As the roundtrip delay in a cellular system increases beyond 200 ms an increased percentage of users will consider the delay bothersome.

Consequently a need exists for an apparatus and method which facilitates a reduction in system delay while maintaining a high channel throughput.

DETAILED DESCRIPTION OF A PREFERRED EMBODIMENT

Figure 1:
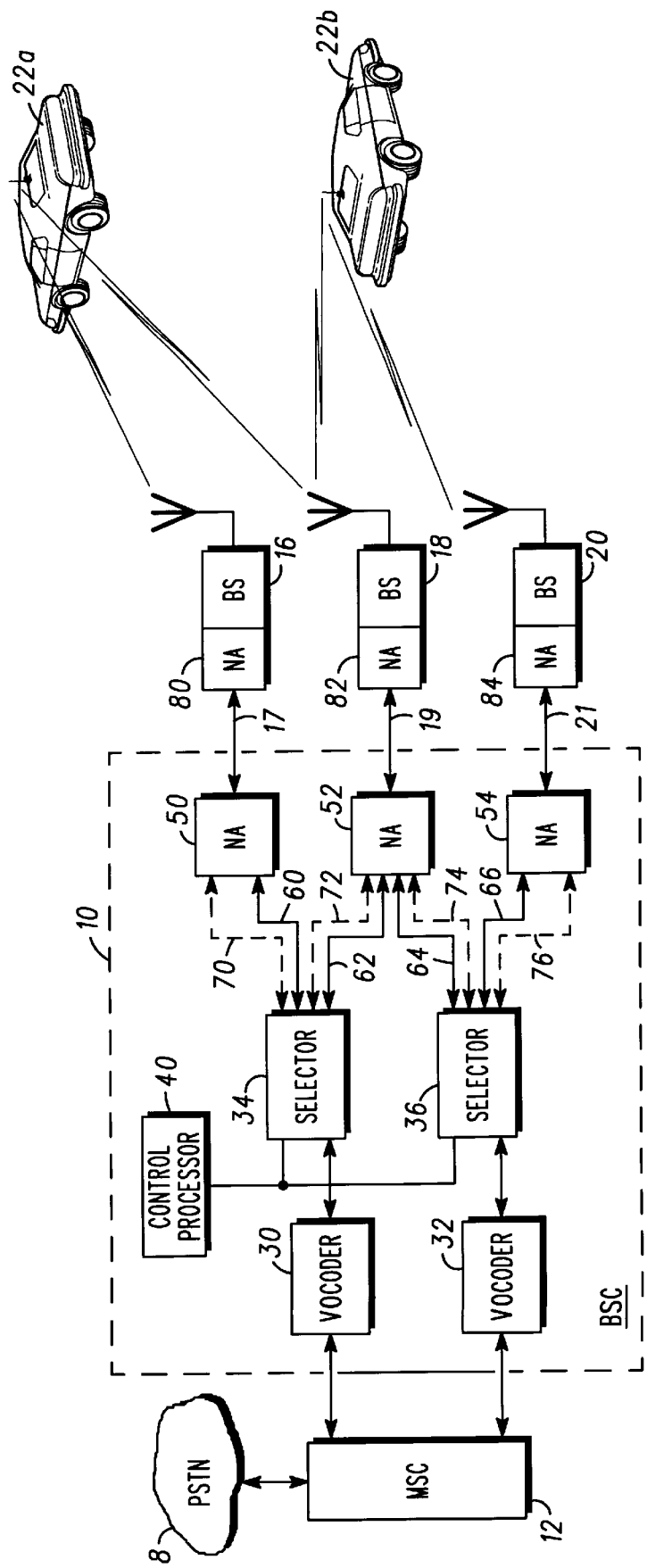
FIG. 1 generally depicts a communication system in accordance with the preferred embodiment of the present invention.

A method and apparatus for determining the order of transmission of packets of information in a communication system includes a priority assignment processor which receives transmission delay information from a delay analyzer and soft handoff state information from a control processor. This information is used to determine a priority level for packets of information. The priority level is used by a network arbiter to determine when the associated packet should be transferred relative to other packets of information.

Generally stated, a method for determining the order of transmission of packets of information in a communication system comprises the steps of receiving a first packet of information associated with a communication between a first mobile unit and at least a first base site transmitter and determining a number of base stations in simultaneous communication with the first mobile unit. The method then receives additional packets of information at the network arbiter and determines the order of transmission of the first and additional packets based, at least in part, on the number of base stations in simultaneous communication with the first mobile unit.

The additional packets of information are associated with independant communications between additional mobile units and at least the first base station. The step of determining the order of transmission further comprises the steps of determining the number of base stations in simultaneous communication with each of the additional mobile units and determining an order of transmission of the first and additional packets based, at least in part, on the number of base stations in simultaneous communication with each of the additional mobile units.

The method further includes the steps of generating the first packet of information at a base station controller, inserting into the packet a data field containing a transmission priority level, where the priority level is based, at least in part, on the number of base stations in simultaneous communication with the first mobile unit and transmitting the first packet of information from the base station controller to a network arbiter. The network arbiter determines the transmission priority level of the first packet by extracting the inserted data field.

The method further includes the step of determining whether a transmission delay between a selector and the first base station is greater than a transmission delay between the selector and a second base station when the number of base stations in simultaneous communication with the first mobile unit is two. In this embodiment, the selector resides in a base site controller. The step of determining the order of transmission of the first and additional packets is further based on whether the transmission delay between the selector and the first base station is greater than the transmission delay between the selector and a second base station.

The general method further includes the step of determining whether a first transmission delay between a selector and the first base station, when compared with a second transmission delay between the selector and a second base station and when compared with a third transmission delay between the selector and a third base station, is the longest, second longest or shortest transmission delay when the number of base stations in simultaneous communication with the first mobile unit is three. In this embodiment, the step of determining the order of transmission of the first and additional packets is further based on whether the first transmission delay, when compared with the second transmission delay the third transmission delay, is the longest, second longest or shortest delay.

FIG. 1 generally depicts a communication system in accordance with the preferred embodiment of the present invention. As shown in FIG. 1, a BSC 10 is in communication with an MSC 12, which is in turn in communication with a PSTN 8. In the preferred embodiment, the communication system is a Code Division Multiple Access (CDMA) cellular radiotelephone system, however it will be recognized by those of ordinary skill in the art that any suitable communication system may utilize the invention. BSs 16, 18 and 20 communicate to BSC 10 through limited bandwidth links 17, 19 and 21. BSs 16, 18 and 20 also communicate with a plurality of mobile units 22a and 22b via the CDMA air interface.

BSC 10 includes a plurality of vocoders 30 and 32 in communication with MSC 12 and selectors 34 and 36. Vocoder 30 receives a digital speech signal from MSC 12 and compresses the digital speech signal into speech packets using a speech compression algorithm. In the preferred embodiment CDMA communication system, the compression algorithm is the Enhanced Variable Rate Codec algorithm (EVRC), however other speech compression algorithms are well known in the art. Selector 34 determines a soft handoff state of a communication associated with a particular packet. This soft handoff state includes the number of BSs in which mobile unit 22a is in simultaneous communication. In the case of FIG. 1, mobile unit 22a is in simultaneous communication with BSs 16 and 18. In the preferred embodiment, selector 34 receives the number of BSs from the control processor 40. The soft handoff state also includes information on the difference in transmission delays between links 17 and 19.

Selector 34 receives speech packets from vocoder 30 and broadcasts them to an appropriate number of network arbiters (NAs) 50, 52 or 54 depending on the soft handoff state. As shown in FIG. 1, the communication to mobile unit 22a has two soft handoff legs, thus each speech packet associated with mobile unit 22a is sent to two NAs 52 and 54 via communication links 60 and 62. Selector 34 utilises the soft handoff state associated with each communication to determine a priority level of each packet. Information on the priority is communicated to the NAs 50 and 52 via control links 70 and 72. In the preferred embodiment, the priority level is embedded into the speech packets by selector 34 and therefore control links 70 and 72 are actually embedded information streams within communication links 60 and 62.

In the preferred embodiment, the priority determination is performed in selectors 34 and 36. However, it will be recognized by those of ordinary skill in the art, that alternative embodiments exist. For example, selector 34 could embed the soft handoff state information into the information packets and the NAs 50 and 52 would then use the soft handoff state to determine the priority level.

Similarly, selector 36 receives speech packets from vocoder 32 and soft handoff state information from control processor 40. Speech packets are forwarded to NAs 52 and 54 via communication links 64 and 66. Selector 36 determines a priority level for each packet based, at least in part, on the soft handoff state information. The priority level is forwarded to NAs 52 and 54 via control links 74 and 76.

In the preferred embodiment, NAs 50, 52 and 54 receive speech packets from a plurality of selectors, corresponding to a plurality of mobile units. NAs 50, 52 and 54 utilize the priority level associated with each packet to determine the order of transmission of the packets into communication links 17, 19 and 21. For example, speech packets destined for mobile unit 22b must be simultaneously transmitted over the air interface by BSs 18 and 20. However, communication link 21 is longer than communication link 19 and hence the packet transmission time from NA 54 to NA 84 is greater than that from NA 52 to NA 82. Hence, a speech packet destined for mobile unit 22b can be buffered longer at arbiter 52 while still ensuring simultaneous transmission via the air interface. Similarly, speech packets destined for mobile unit 22a must be simultaneously transmitted over the air interface by BSs 16 and 18. The packet transmission time from NA 52 to NA 82 is greater than that from NA 50 to NA 80. Hence, speech packets destined for mobile unit 22a can be buffered longer at arbiter 50 than arbiter 52.

In the preferred embodiment, a priority scheme, based at least in part on the soft handoff state information, is utilized by the NAs to determine the packet transmission order in accordance with the invention. For simulcast communication systems with up to three soft handoff legs per communication, the packets are prioritized in the following order:

1. packets corresponding to the longest leg of a 3-way call;
2. packets corresponding to the longest leg of a 2-way call;
3. packets corresponding to a 1-way call;
4. packets corresponding to the middle leg of a 3-way call;
5. packets corresponding to the shortest leg of a 2-way call;
6. packets corresponding to the shortest leg of a 3-way call.

In the preferred embodiment the priority level of packets corresponding to the longest leg of 3-way calls is the same as those corresponding to the longest leg of 2-way calls. Also the priority level of packets corresponding to the shortest leg of 2-way calls is the same as those corresponding to the shortest leg of 3-way calls. Hence, a reduced four level priority scheme would be packets corresponding to:

1. the longest leg of 2-way or 3-way calls;
2. 1-way calls;
3. the middle leg of 3-way calls;
4. the shortest leg of 2-way or 3-way calls.

Priority [1] is the highest priority, and packets assigned to priority [1] are transferred into the packet pipe first.

Figure 2:
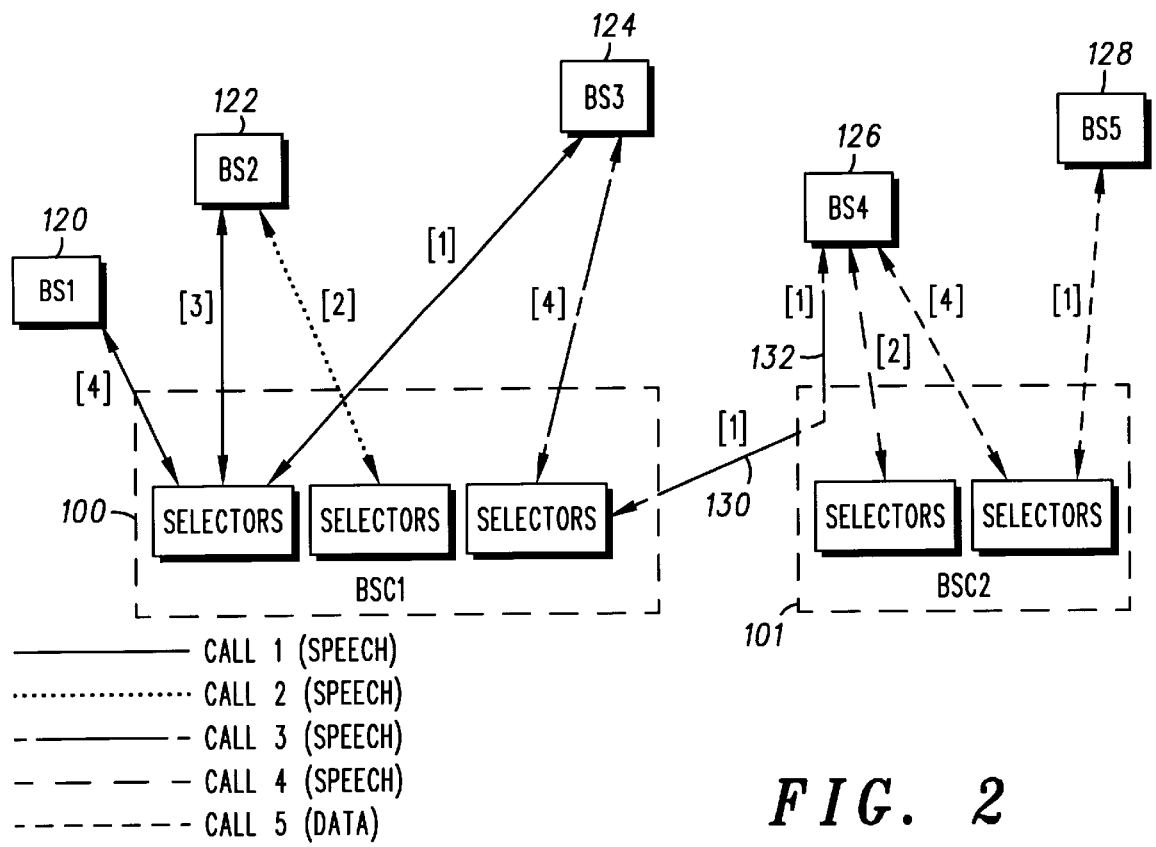
FIG. 2 depicts a communication system in accordance with the packet priority scheme of the preferred embodiment of the present invention.

FIG. 2 illustrates the application of the priority scheme to five calls, each one having a different communication scenario. Relative transmission delays are indicated by the relative length of the communication links 220, 222, 224 in FIG. 2. BSC 100 is in direct communication with BSs 120, 122 and 124 while BSC 101 is in direct communication with BSs 126 and 128. In addition, BSC 100 is in indirect communication with BS 126 via BSC 101.

Communication 1 is in three-way soft handoff. Following the priority scheme of the preferred embodiment, the packets to be transmitted via the longest leg, to BS 124, are assigned a priority [1] while the packets to be transmitted via the middle leg, to BS 122, are assigned a priority [3]. The packets to be transmitted via the shortest leg, to BS 120, are assigned a low priority [4].

Communication 2 is a one-way call, not in soft handoff. Following the priority scheme of the preferred embodiment, packets associated with communication 2 are assigned a priority [2] for transmission to BS 122.

Communication 3 is in two-way soft handoff, with the longest leg being via BSC 101 to BS 126. Following the priority scheme of the preferred embodiment, the packets to be transmitted on the longest leg are assigned a priority [1]. Note that this priority can be used for prioritizing packet transfer on both communication links 130 and 132. The packets to be transmitted via the shortest leg, to BS 124, are assigned a low priority [4].

Communication 4 is a one-way communication, not in soft handoff. Following the priority scheme of the preferred embodiment, packets associated with communication 4 are assigned a priority [2] for transmission to BS 126.

Communication 5 is in two-way soft handoff. Following the priority scheme of the preferred embodiment, packets associated with the longest leg, to BS 128, are assigned a priority [1] while packets to be transmitted via the shortest leg, to BS 126, are assigned a priority [4].

Figure 3:
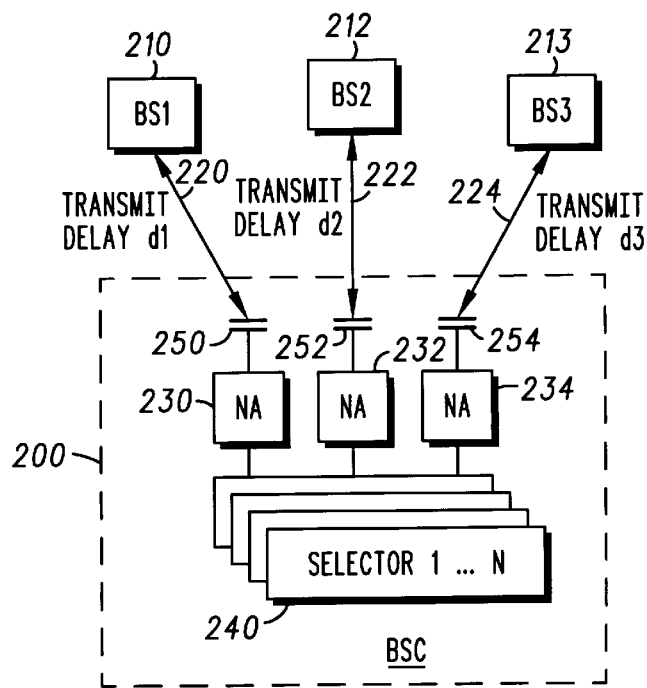
FIG. 3 is a diagram generally representing transmission and buffering delays in accordance with the preferred embodiment of the invention.

Prioritizing packet transfer in accordance with the priority scheme of the preferred embodiment results in an average system delay reduction. FIG. 3 shows a BSC 200 in communication with three BSs 210, 212 and 214 via communication links 220, 222 and 224. Associated with communication links 220, 222 and 224 are transmission delays 81, 62 and 63. Within the BSC 200 are NAs 230, 232 and 234 receiving information packets and associated priority level data from a plurality of selectors 240. Buffers 250, 252 and 254 are associated with each NA. Without the priority scheme of the preferred embodiment, the maximum buffering delay associated with packets for a communication is primarily dependant on the number of calls being carried on the communication links. With the priority scheme in accordance with the invention, the maximum buffering delay, while still being dependant on the call loading, will also be determined by the soft handoff state.

A simplified communication (or call) model can be used to demonstrate the delay benefit of the priority scheme in accordance with the invention. Although the call model is a simple one for a simple example, it will be apparent to one skilled in the art that the technique described will also apply to much larger and more complex systems. For the analysis, the following assumptions are made: all packets are equal size; packets from all calls arrive at the NA for a particular link at the same time with a periodicity of 20 ms; each link can carry a maximum of 125 packets every 20 ms; each link actually carries 100 packets every 20 ms; transmission delays $\delta_1$, $\delta_2$, and $\delta_3$ are 2 ms, 4 ms and 6 ms respectively; and the maximum delay, $\delta_{max}$, is determined by the transmission delay, $\delta_{tx}$, plus the maximum buffering delay, $\delta_{maxbuff}$.

For the case of no priority scheme, the maximum buffering delay is determined as follows:

$$\delta_{maxbuff}=(\text{No of calls on link}/C_{link})*20 \text{ ms}$$

where $C_{link}$=Link Capacity (125 in example). Hence, $\delta_{maxbuff}=(100/125) *20$ ms=16 ms.

If the three BS system depicted in FIG. 3 is considered, with 100 calls on each BS, an example call distribution and the maximum delay $\delta_{max}$ for each of the different scenarios when no priority scheme is in place is shown in Table 1.

TABLE 1

| Scenario | $\delta_{max} = \delta_{maxbuff} + \delta_{tx}$ |
| --- | --- |
| 25 one-way calls on BS1 | 18 ms |
| 25 one-way calls on BS2 | 20 ms |
| 25 one-way calls on BS3 | 22 ms |
| 25 two-way calls on BS1 & BS2 | 20 ms |
| 25 two-way calls on BS2 & BS3 | 22 ms |
| 25 two-way calls on BS1 & BS3 | 22 ms |
| 25 two-way calls on BS1, BS2 & BS3 | 22 ms |

Given the call distribution of Table 1:
Average Max Delay = (25 * $\Sigma\delta_{max}$)/Total No of Calls = 20.86 ms
With the soft handoff priority scheme in place, the maximum delay for a packet depends on the number of packets at it's priority or higher. Thus:
$\delta_{maxbuff[1]}$ = (No of [1] packets/$C_{link}$)*20 mS
$\delta_{maxbuff[2]}$ = (No of [1]&[2] packets/$C_{link}$)*20 mS
$\delta_{maxbuff[3]}$ = (No of [1],[2]&[3] packets/$C_{link}$)*20 mS
$\delta_{maxbuff[4]}$ = (No of [1],[2],[3]&[4] packets/$C_{link}$)*20 mS For example, given 25 packets at priority [1], 25 packets at priority [2] and 50 packets at priority [4], $\delta_{maxbuff[1]}$=4 ms, $\delta_{maxbuff[2]}$=8 ms, $\delta_{maxbuff[4]}$=16 ms. To establish the average maximum delay with the priority scheme, the links are first analyzed individually and then the worst case delay for each call is taken. Tables 2, 3 and 4 show the max delay for each call scenario on links 220, 222 and 224 respectively. Again $\delta_{max}=\delta_{maxbuff}+\delta_{tx}$.

TABLE 2

| BS 1 Scenario | Priority | $\delta_{max}$ |
|---|---|---|
| 25 one-way calls on BS1 | 2 | 6 ms |
| 25 two-way calls on BS1 & BS2 | 4 | 18 ms |
| 25 two-way calls on BS1 & BS3 | 4 | 18 ms |
| 25 three-way calls on BS1, BS2 & BS3 | 4 | 18 ms |

TABLE 3

| BS 2 Scenario | Priority | $\delta_{max}$ |
|---|---|---|
| 25 two-way calls on BS1 & BS2 | 1 | 8 ms |
| 25 one-way calls on BS2 | 2 | 12 ms |
| 25 three-way calls on BS1, BS2 & BS3 | 3 | 16 ms |
| 25 two-way calls on BS2 & BS3 | 4 | 20 ms |

TABLE 4

| BS 3 Scenario | Priority | $\delta_{max}$ |
|---|---|---|
| 25 two-way calls on BS2 & BS3 | 1 | 18 ms |
| 25 two-way calls on BS1 & BS3 | 1 | 18 ms |
| 25 three-way calls on BS1, BS2 & BS3 | 1 | 18 ms |
| 25 one-way calls on BS3 | 2 | 22 ms |

Taking, for each call, the delay of the leg with the longest delay yields the maximum delays shown in Table 5.

TABLE 5

| Scenario | $\delta_{max} = \delta_{maxbuff} + \delta_{tx}$ |
|---|---|
| 25 one-way calls on BS1 | 6 ms |
| 25 one-way calls on BS2 | 12 ms |
| 25 one-way calls on BS3 | 22 ms |
| 25 two-way calls on BS1 & BS2 | 18 ms |
| 25 two-way calls on BS2 & BS3 | 20 ms |
| 25 two-way calls on BS1 & BS3 | 18 ms |
| 25 three-way calls on BS1, BS2 & BS3 | 18 ms |

Given the call distribution of Table 1:

Average Max Delay=$(25*\Sigma\delta_{max})$/Total No of Calls=16.29 ms

As can be seen, a reduction in the average maximum delay is achieved by taking advantage of the differential delays inherent in a CDMA or simulcast system in accordance with the invention.

Figure 4:
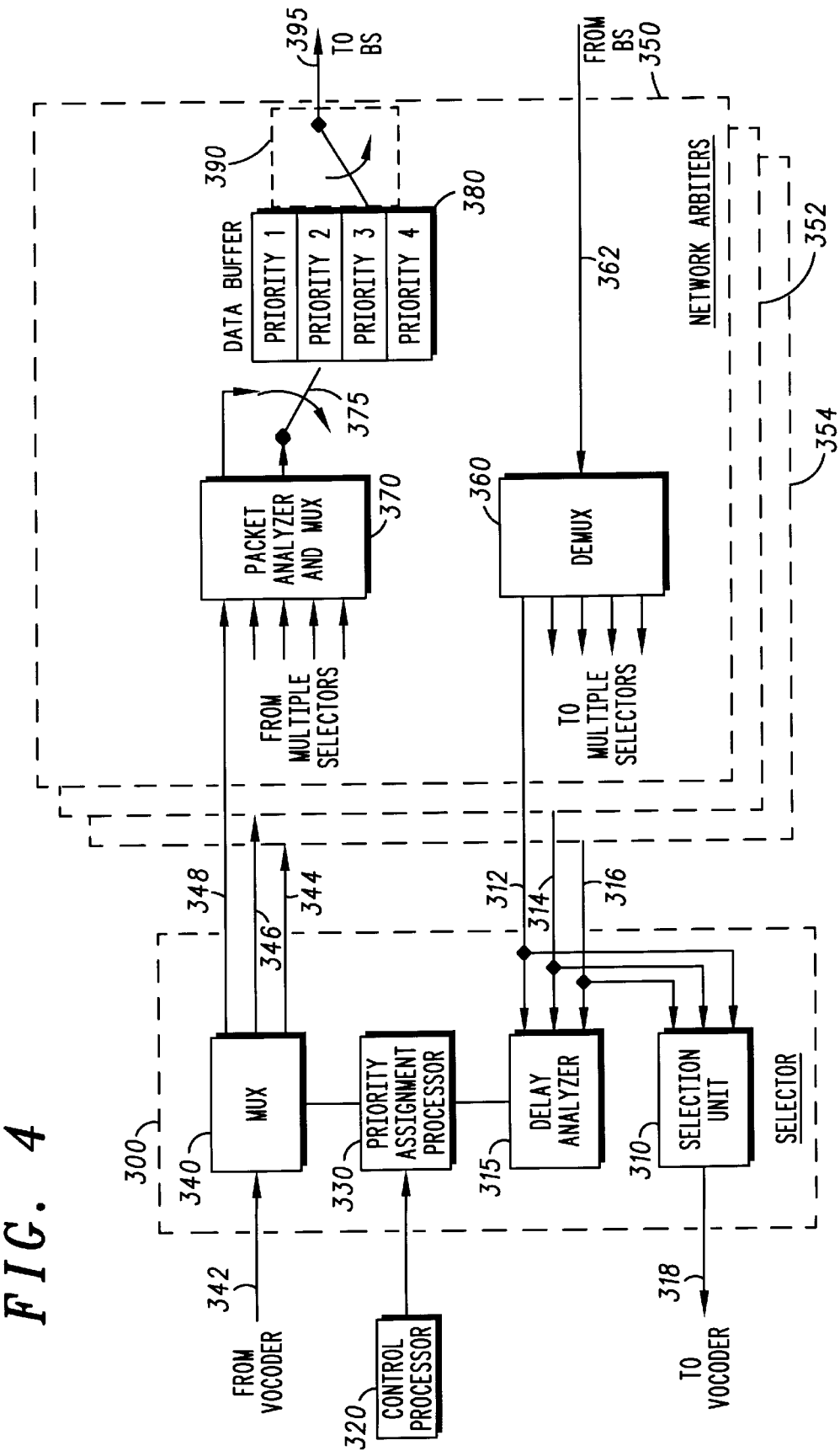
FIG. 4 depicts a block diagram of a system for determining the order of transmission of packets of information in accordance with the preferred embodiment of the invention.

FIG. 4 depicts a block diagram of a selector and NA configuration in accordance with the invention. As shown in FIG. 4, selector 300 is connected to three NAs 350, 352 and 354 and each NA is connected via a packet pipe to a BS. This configuration implies that the associated communication is in three-way soft handoff. As the associated mobile unit moves within the system, the number of soft handoff legs and the NAs used will vary. NA 350 includes a demultiplexer 360 which is responsible for analysing all packets received on communication link 362. Demultiplexer 360 determines the destination selector for each packet. All packets associated with the communication of interest are passed to selector 300 via communication link 312.

Selector 300 also receives packets associated with other soft handoff legs of the communication from NA 352 via communication link 314 and from NA 354 via communication link 316. A selection unit 310 analyzes the three packets, in the case of three-way soft handoff, associated with each speech frame and, using embedded packet quality information, selects the best frame. This selection process is well known in the art. The selected packet is passed to the vocoder (not shown) via communication link 318.

The three packets are also routed to a delay analyzer 315 which determines the relative differential delays between the legs of the communication. The determination is performed based upon delay information embedded in each packet and on the arrival time of each packet at delay analyzer 315. The embedded delay information provides data on the arrival time of associated forward link packets received at the BSs from the BSC. In the preferred embodiment, the embedded delay information conforms to the Packet Arrival Timing Error (PATE) information field as specified in the traffic frame format of the Telecommunications Industry Association standard 634A (TIA/IS-634-A). Using this delay information, delay analyzer 315 determines which legs of the call exhibit the longest, second longest and shortest delay. This information is passed to the priority assignment processor 330.

Priority assignment processor 330 also receives soft handoff state information from the control processor 320 which indicates the number of soft handoff legs associated with the communication and hence the number of destination BSs which associated packets are to be sent to. Priority assignment processor 330 uses the delay information and the number of soft handoff legs to assign a priority level to each of the legs of the communication as described above in accordance with the invention. The priority levels are then passed to the multiplexer (MUX) 340.

MUX 340 receives a speech frame from a vocoder (not shown) via communication link 342. In the preferred embodiment of the CDMA communication system, each speech frame represents 20 ms of speech. MUX 340 replicates the speech frame, the number of duplicates being dependant on the number of soft handoff legs associated with the communication. Each of the speech frames is appended with additional information to form a speech packet. In the preferred embodiment, the speech packet conform to the traffic frame format specified in TIA/IS-634-A as mentioned above. The priority level associated with the packet's destination leg is then appended to each speech packet by MUX 340.

The speech packets with the tagged priority level are then sent to the NAs associated with the destination BSs. In the three-way soft handoff example of FIG. 4, one packet is sent to NA 354 via communication link 344, one packet is sent to NA 352 via communication link 346 and the third packet is sent to NA 350 via communication link 348.

NA 350 receives speech packets tagged with their appropriate priority level from multiple selectors including a packet from selector 300. Each speech packet is associated with a call. A packet analyzer and MUX 370 extracts the priority level tag and writes each packet to a region of data buffer 380, the region being dependent on the priority level. In the preferred embodiment, a router 375 routes the packet to addressable memory within data buffer 380. MUX 390 then reads the speech packets from data buffer 380 in priority order and transmits them to the BS (not shown) via communication link 395. Although in this embodiment the priority level tag is extracted, in an alternative embodiment the tag remains appended to each packet to assist in determining the order of transmission through other entities and communication links of the system. For example each BS could use the priority level received in each forward link packet to determine a priority level for reverse link packets associated with the same communication.

It should be understood that the implementation of other variations and modifications of the invention in its various aspects will be apparent to those of ordinary skill in the art, and that the invention is not limited by the specific embodiments described. For example, one skilled in the art will easily recognize that the method and apparatus for ordering packets for transmission can be extended from the 3-way example to an n-way scenario. It is therefore contemplated to cover by the present invention, any and all modifications, variations, or equivalents that fall within the spirit and scope of the basic underlying principles disclosed and claimed herein.

We claim:

1. A method for determining the order of transmission of packets of information in a communication system, comprising the steps of:
    receiving a first packet of information associated with a communication between a first mobile unit and at least a first base site transmitter;
    determining a number of base stations in simultaneous communication with the first mobile unit;
    receiving additional packets of information; and
    determining the order of transmission of the first and additional packets transmitted by the first base site transmitter based, at least in part, on the number of base stations in simultaneous communication with the first mobile unit.

2. The method of claim 1, wherein the additional packets of information are associated with independent communications between additional mobile units and at least the first base station.

3. The method of claim 2, wherein the step of determining the order of transmission further comprises the steps of:
    determining the number of base stations in simultaneous communication with each of the additional mobile units; and
    determining an order of transmission of the first and additional packets based, at least in part, on the number of base stations in simultaneous communication with each of the additional mobile units.

4. The method of claim 1 further comprising the steps:
    generating the first packet of information at a base station controller;
    inserting into the packet a data field containing a transmission priority level, where the priority level is based, at least in part, on the number of base stations in simultaneous communication with the first mobile unit;
    transmitting the first packet of information from the base station controller to a network arbiter.

5. The method of claim 4, whereby the network arbiter determines the transmission priority level of the first packet by extracting the inserted data field.

6. The method of claim 1, further comprising the step of determining whether a transmission delay between a selector and the first base station is greater than a transmission delay between the selector and a second base station when the number of base stations in simultaneous communication with the first mobile unit is two.

7. The method of claim 6, wherein the selector resides in a base site controller.

8. The method of claim 6, wherein the step of determining the order of transmission of the first and additional packets is further based on whether the transmission delay between the selector and the first base station is greater than the tansmission delay between the selector and a second base station.

9. The method of claim 1, further comprising the step of determining whether a first transmission delay between a selector and the first base station, when compared with a second transmission delay between the selector and a second base station and when compared with a third transmission delay between the selector and a third base station, is the longest, second longest or shortest transmission delay when the number of base stations in simultaneous communication with the first mobile unit is three.

10. The method of claim 9, wherein the step of determining the order of transmission of the first and additional packets is further based on whether the first transmission delay, when compared with the second transmission delay the third transmission delay, is the longest, second longest or shortest delay.

11. A method for determining the order of transmission of packets of information, comprising the steps of:
    receiving a plurality of packets of information, each packet being associated with differnt mobile units and at least a first base station;
    determining for each packet whether the associated communication is between the associated mobile unit and either the first base station, the associated mobile unit and two base stations or the associated mobile unit and three base stations;
    assigning a first priority level with those packets associated with mobile unit only in communication with the first base station;
    assigning a second priority level with those packets associated with mobile units in communication with two base stations when a transmission delay associated with the first base station is greater than a transmission delay associated with a second base station;
    assigning a third priority level with those packets associated with mobile units in communication with two base stations when a transmission delay associated with the first base station is less than a transmission delay associated with the second base station; and
    sending those packets assigned with a second priority level before those packets assigned with a third priority level.

12. The method of claim 11 further comprising the step of sending those packets assigned with the second priority level before those packets assigned with the first level.

13. The method of claim 11 further comprising the step of sending those packets assigned with the first priority level before those packets assigned with the third priority level.

14. The method of claim 11 further comprising the step of assigning a fourth, fifth or sixth priority level with those packets associated with mobile units in communication with three base stations, the priority level based, at least in part, on whether the transmission delay between a selector and the first base station, when compared with the delay between the selector and the second base station and when compared with the delay between the selector and a third base station, is the longest, second longest or shortest delay.

15. The method of claim 14 further comprising the step of sending those packets assigned with the fourth priority level before those packets assigned with the fifth priority level and the sixth priority level.

16. The method of claim 15 further comprising the step of sending those packets assigned with the fifth priority level before those packets assigned with the sixth priority level.

17. The method of claim 14 further comprising the step of sending those packets assigned with the fourth priority level before those packets assigned with the first priority level.

18. The method of claim 17 further comprising the step of sending those packets assigned with the fifth priority level before those packets assigned with the third priority level.

19. The method of claim 14 where the second and fourth priority level are substantially similar.

20. The method of claim 14 where the third and sixth priority level are substantially similar.

21. A system for determining an order of transmission of packets of information in a communication system comprising:

means for receiving a plurality of packets of information;

means for determining the number of base stations in communication with a first mobile unit;

means for determining the order of transmission of the plurality of packets transmitted by a first base station based, at least in part, on the number of base stations in communication with the first mobile unit.

22. The system of claim 21, further comprising means for determining the number of base stations in simultaneous communication with additional mobile units.

23. The system of claim 22. wherein the means for determining the order of transmission of the plurality of packets is based, at least in part, on the number of base stations in simultaneous communication with the additional mobile units.

24. The system of claim 21, further comprising means for comparing the transmission delay between a selector and a first base station and a transmission delay between the selector and a second base station.

25. The system of claim 24, further comprising means for determining the order of transmission of packets of information based on the comparison.

26. A system for transmitting packets of information in a communication system comprising:

a selector including means for determining the number of base stations in simultaneous communication with a mobile unit;

means for comparing transmission delays between the selector and the base stations in simultaneous communication with the mobile unit;

means for assigning a priority level to a packet of information based, at least in part, on the number of base stations in communication with the mobile unit;

means for inserting the priority level into packets of information; and a network arbiter including;

means for extracting the priority level from the packets of information;

means, responsive to the priority level, for ordering the transmission of packets of information; and means for transmitting the packets of information based on the ordering of transmission.

* * * * *